United States Patent [19]

Hunt et al.

[11] Patent Number: 4,949,259

[45] Date of Patent: Aug. 14, 1990

[54] DELAY COEFFICIENT GENERATOR FOR ACCUMULATORS

[75] Inventors: Thomas J. Hunt, Derry, N.H.; David Lipschutz, Lexington, Mass.; Bernard J. Savord, Ithaca, N.Y.

[73] Assignee: Hewlett-Packard Company, Palo Alto, Calif.

[21] Appl. No.: 336,536

[22] Filed: Apr. 11, 1989

Related U.S. Application Data

[63] Continuation of Ser. No. 114,815, Oct. 29, 1987, abandoned.

[51] Int. Cl.⁵ .............................................. G01N 29/00

[52] U.S. Cl. .................................. 364/413.25; 73/626; 73/628

[58] Field of Search .................. 73/626, 628; 128/660; 364/413.25

[56] References Cited

U.S. PATENT DOCUMENTS 4,140,022 2/1979 Maslak .................................. 73/626
4,309,906 1/1982 Northeved et al. .................. 73/612
4,472,973 9/1984 Sugai et al. ............................ 73/626
4,487,073 12/1984 Sumino ................................ 73/626
4,733,562 3/1988 Saugeon ............................... 73/626

FOREIGN PATENT DOCUMENTS 2011075 7/1979 United Kingdom .

*Primary Examiner*—Clark A. Jablon
*Attorney, Agent, or Firm*—Frank R. Perillo

[57] ABSTRACT

Apparatus for calculating the delay coefficients to be used for the transducer of a linear array at successive focal points along each radial line of a sector along which ultrasonic pulses are transmitted comprising a plurality of clocked accumulators connected in series, the accumulators being preloaded with appropriate combination of the coefficients of the successive terms of a series expressing an approximation of the formula, $D=R-\sqrt{(X-Xo)^2+Yo^2}$ where R is the distance of a focal point from a given point in the sector, X is the number of the accumulator from the origin and Xo, Yo are the coordinates of the focal point.

11 Claims, 5 Drawing Sheets

| $C_5$ | | $C_4$ | $C_3$ | $C_2$ | $C_1$ |
|---|---|---|---|---|---|
| X | CLK | REG 4 6A | REG 3(6AX+2B) | REG 2(6AX+2BX+C) | REG 1 |
| | 1 | 0 | 0 | 0 | 0 |
| 0 | 2 | 6A | 6A + 2B | A + B + C | 0 |
| 1 | 3 | 6A | 12A + 2B | 7A + 3B + C | A + B + C |
| 2 | 4 | 6A | 18A + 2B | 19A+ 5B + C | 8A+ 4B+ 2C |
| 3 | 5 | 6A | 24A + 2B | 37A+ 7B + C | 27A+ 9B + 3C |
| 4 | 6 | 6A | 30A + 2B | 61A+ 9B + C | 64A+ 16B+ 4A |
| 5 | 7 | 6A | 36A + 2B | 91A+ 11B+ C | 125A+ 25B+ 5C |
| 6 | 8 | 6A | 42A + 2B | 127A+ 13B+ C | 216A+ 36B+ 6C |
| 7 | 9 | 6A | 48A + 2B | 169A+15B + C | 343A+ 49B+ 7C |
| 8 | 10 | 6A | 54A + 2B | 257A+ 17B+ C | 512A+64B+ 8C |

FIG 3

| X | REG 4 | REG 3 | REG 2 | REG 1 |
|---|---|---|---|---|
| 1/2 | 6A | 9A + 2B | 26/8A + 2B + C | A/8 + B/4 + C/2 |
| 3/2 | 6A | 15A + 2B | 98/8A + 4B + C | 27/8A + 98/4 + 3C/2 |
| 5/2 | 6A | 21A + 2B | 218/8A + 6B + C | 126/8A + 258/4 + 5/2C |
| | | | | 393/3A + 498/4 + 7/2C |
| 0 | 0 | 0 | 0 | 0 |
| 0 | 0 | 0 | 0 | 0 |
| 0 | 0 | 0 | 0 | 0 |
| 63/2 | 6A | 195A +2B | 23,048/8A + 62B + C | 251,627/8A + $\frac{3977}{4}$B + $\frac{63}{2}$C |
| 63/2 | 6A | 201A +2B | $\frac{24,578}{8}$A + 64B + C | $\frac{274,625}{8}$A + $\frac{4225}{4}$B + $\frac{65}{2}$C |
| 0 | 0 | 0 | 0 | 0 |
| 0 | 0 | 0 | 0 | 0 |
| 0 | 0 | 0 | 0 | 0 |
| 127/2 | 6A | 387 + 2B | $\frac{48,007}{8}$A + 126B + C | $\frac{2,048,383}{8}$A + $\frac{16,129}{4}$B + $\frac{127}{2}$C |

FIG 4

DELAY COEFFICIENT GENERATOR FOR ACCUMULATORS

CROSS REFERENCE TO RELATED APPLICATION

This application is a continuation of application Ser. No. 114,815, filed Oct. 29, 1987, now abandoned.

BACKGROUND OF THE INVENTION

In ultrasonic imaging systems utilizing a phased array of transducer elements, pulses of ultrasonic waves are successively transmitted along different radial lines having their origin in the center of the array. When a pulse traveling along a radial line meets body tissue, a portion of its energy is reflected back to the array, but because the distances between the point of reflection and each of the transducers is different, the electrical waves produced by the transducers in response to the reflection have different phases. Summing these electrical waves would produce a weak signal for the purpose of controlling the intensity of an image. In order to obtain a strong signal, the electrical waves must be brought reasonably close to a cophasal relationship. This is not done at all points along a radial line but at each of a plurality of what are called "focal points". Best focus is attained at these points but if they are close enough together, the worst focus at points between them is tolerable. The distance between the points of worst focus on either side of a focal point is called a "focal zone".

In attaining the desired cophasal relationship, it is necessary to compensate for the respective differences in the time it takes the reflections from a focal point to travel the different distances to the respective transducer elements. Compensation is attained by introducing the proper effective compensating delays for each focal point into the paths of the electrical waves for each transducer element. Initially, the required information was burned into ROMs that were read at the appropriate times and used to control the means for providing the necessary delays. As this necessitated a large ROM capacity, microprocessors were used to provide in real time the information as to the difference in the time required for a reflection to travel from each focal point to each transducer. Whereas this method was satisfactory for systems having 64 transducers, 16 focal zones and 128 radial lines, it is impracticable for system in which the numbers of these parameters are substantially increased. If, for example, a system has 128 transducers, 256 radial lines and requires many more focal zones because of the loss in depth of field resulting from the increased aperture, the magnitude of the task of making the calculations increases by a factor of about 8.

BRIEF SUMMARY OF THE INVENTION

In accordance with this invention a hard wired circuit calculates the differences D between the radius R of a focal point and the distances between the focal point and the transducer elements of the array just prior to the time when reflections from the focal point reach the transducers. The differences D are provided to means for inserting the directly related compensating delays into the circuits for the individual transducer elements. The process is then repeated for each successive focal point in turn. Because of its speed, the circuit can make these calculations in real time for a system having more transducer elements and focal zones than could be practicably handled by a microprocessor.

The basic circuit includes a plurality of accumulators connected in series that are respectively preloaded with different values for each focal point before the calculation of D for the transducer elements are made. The values that are preloaded change with the radius R of the focal point, the angle $\theta$ that the radial line on which the focal point is located makes with a line perpendicular to the array and the space $\Delta X$ between the centers of adjacent transducer elements. All accumulators are clocked at the same time. The preloaded value of the last 15 accumulator in the series corresponds to the difference, D, between the radius of the focal point and the distance between that focal point and a transducer element that is on one side of the array. As each clock pulse occurs, the preloaded values work their way through the accumulators so as to produce a value at the output of the last accumulator that is the difference, D, for the next transducer element. If only one series of accumulators is used, the process would then be performed for the transducer elements on the other side of the array.

In general, the respective values with which the accumulators are preloaded are different combinations of the coefficients, or portions thereof, of terms of a series expressing the difference, D, between the radius of a focal point and its distance from a transducer element as a function of the distance X of that element from the center of the array. Each term of the series includes a different power of the independent variable X. The highest power used depends on the required resolution, and the number of accumulators equals the highest power.

If the coefficients of the powers of X are those of a Taylor or Maclaurin series, the calculated distance, D, will be correct for a transducer element at the center of the array but will have an error that increases with the distance of a transducer element from the center. A more evenly distributed and smaller error results if the coefficients for the powers of X are derived from Legendre polynomials.

One of the advantages of the invention is the fact that simultaneous calculations for the distance D can be made for different groups of transducer elements of the array so as to save time. One way of doing this is to provide a separate series of accumulators for each group and respectively preload them with the values that the accumulators of a single series would have when it reaches the transducer element at the end of the group closer to the center of the array.

The method just mentioned for simultaneously calculating the distances D for transducer elements in groups spaced from the center of the array would have the same error as would result from calculating the distances D for these same transducers with a single series of accumulators. Smaller errors would result if a series with an offset, such as that of Taylor is used instead of a Maclaurin series, in which case, the distance between a focal point and the center of the group would be substituted for the radius in the equation and the angle $\theta'$ between a line from the focal point to the center of the group and a vertical line would be substituted for the angle $\theta$ between vertical and the radial line passing through the focal point. In such case, there would be zero error for the central transducer element of the group and increasing error for the transducer elements on either side unless the coefficients of the equation are derived from Legendre polynomials.

BRIEF DESCRIPTION OF THE DRAWINGS

FIG. 3 is a table of the values in the registers of the respective accumulator of FIG. 2 where a transducer element at one end of a group is at the center of the array.

FIG. 4 is a table of the values in the registers of the respective accumulators of FIG. 2 where a transducer element at one end of a group is spaced from the center of the array by ΔX/2 where ΔX is the spacing between transducer elements.

DETAILED DESCRIPTION OF THE INVENTION

The Mathematics

Figure 1:
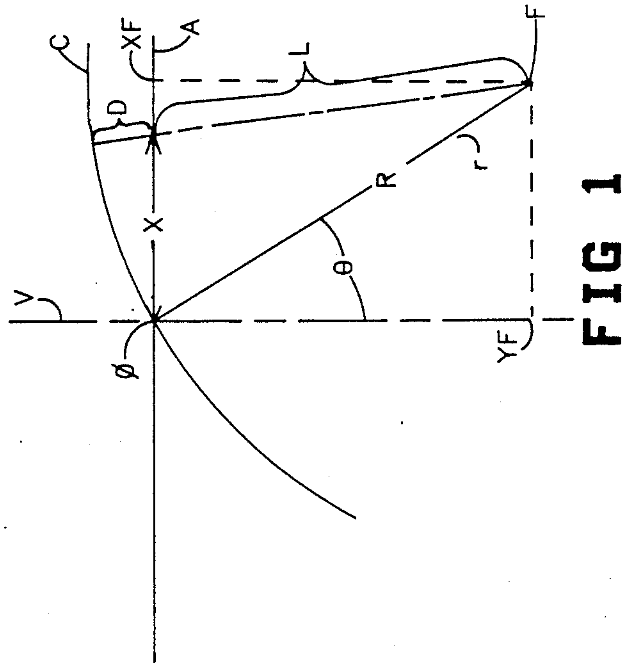
FIG. 1 shows an array of transducers, one of the radial lines along which pulses of ultrasonic waves are transmitted and the difference between the distance of a focal point from the origin and its distance from a particular transducer element.

Although individual transducers are not shown in FIG. 1, they are assumed to be distributed along a line A so as to form an array having its center at X=0. Consider a focal point F located on a radial line r that makes an angle of θ with a line V that is perpendicular to the line A. The radial distance of F from X=0 is R, and its coordinates are XF, YF. A circular arc C having a radius R is drawn with F as its center so that is passes through X=0, and a dash-dot line is drawn from F so as to intersect the line A and the arc C.

From inspection $$D+L=R \quad (1)$$

$$D=R-L \quad (2)$$

$$\sqrt{(XF-X)^2+YF^2} \quad (3)$$

Multiplying and dividing the radical by R gives $$D = R - R\sqrt{\left(\frac{X_F}{R} - \frac{X}{R}\right)^2 + \left(\frac{Y_F}{R}\right)^2} \quad (4)$$

$$\frac{XF}{R} = \text{SIN}\,\theta \text{ and } \frac{YF}{R} = \text{COS}\,\theta$$

equation (4) becomes $$D = R - R\sqrt{\left(\text{SIN}\theta - \frac{X}{R}\right)^2 + \text{COS}^2\theta} \quad (5)$$

$$D = R - R\sqrt{\text{SIN}^2\theta - \frac{2X}{R}\text{SIN}\theta + \frac{X^2}{R^2} + \text{COS}^2\theta} \quad (6)$$

$$D = R - R\sqrt{\frac{X^2}{R^2} - 2X\frac{\text{SIN}\theta}{R} + 1} \quad (7)$$

Equation (7) has the form $$D=R-R\sqrt{aX^2+bx+1} \quad (8)$$

where $$a = \frac{1}{R^2}; \quad b = -\frac{2\text{SIN}\theta}{R}$$

The Maclaurin series for D as a function of X is $$D(X) = D(\phi) + D'(\phi)X + D''(\phi)\frac{X^2}{2!} + D'''(\phi)\frac{X^3}{3!} + D^m(\phi)\frac{X^m}{m!} \quad (9)$$

It can be shown that $$D(\phi)=\phi \quad (10)$$

$$D'(\phi)=\text{SIN}\theta$$

$$D''(\phi) = +\frac{1}{R}(1-\text{SIN}^2\theta)$$

$$D'''(\phi) = -\frac{3\,\text{SIN}\theta}{R^2}(1-\text{SIN}^2\theta)$$

so that by substitution in (9) we obtain $$D(X) = \phi + \text{SIN}\,\theta\,X + \frac{1}{2R}\text{COS}^2\theta X - \frac{\text{SIN}\theta\text{COS}^2\theta}{2R^2}X3 \quad (11)$$

Equation (11) can be expressed in the form $$D(X)=AX^3+BX^2+CX \quad (12)$$

where $$A = -\frac{\text{SIN}\,\theta\,\text{COS}^2\,\theta}{2R^2}$$

$$B = +\frac{\text{COS}^2\theta}{2R}$$

$$C=\text{SIN}\theta$$

An Embodiment of the Invention

Figure 2:
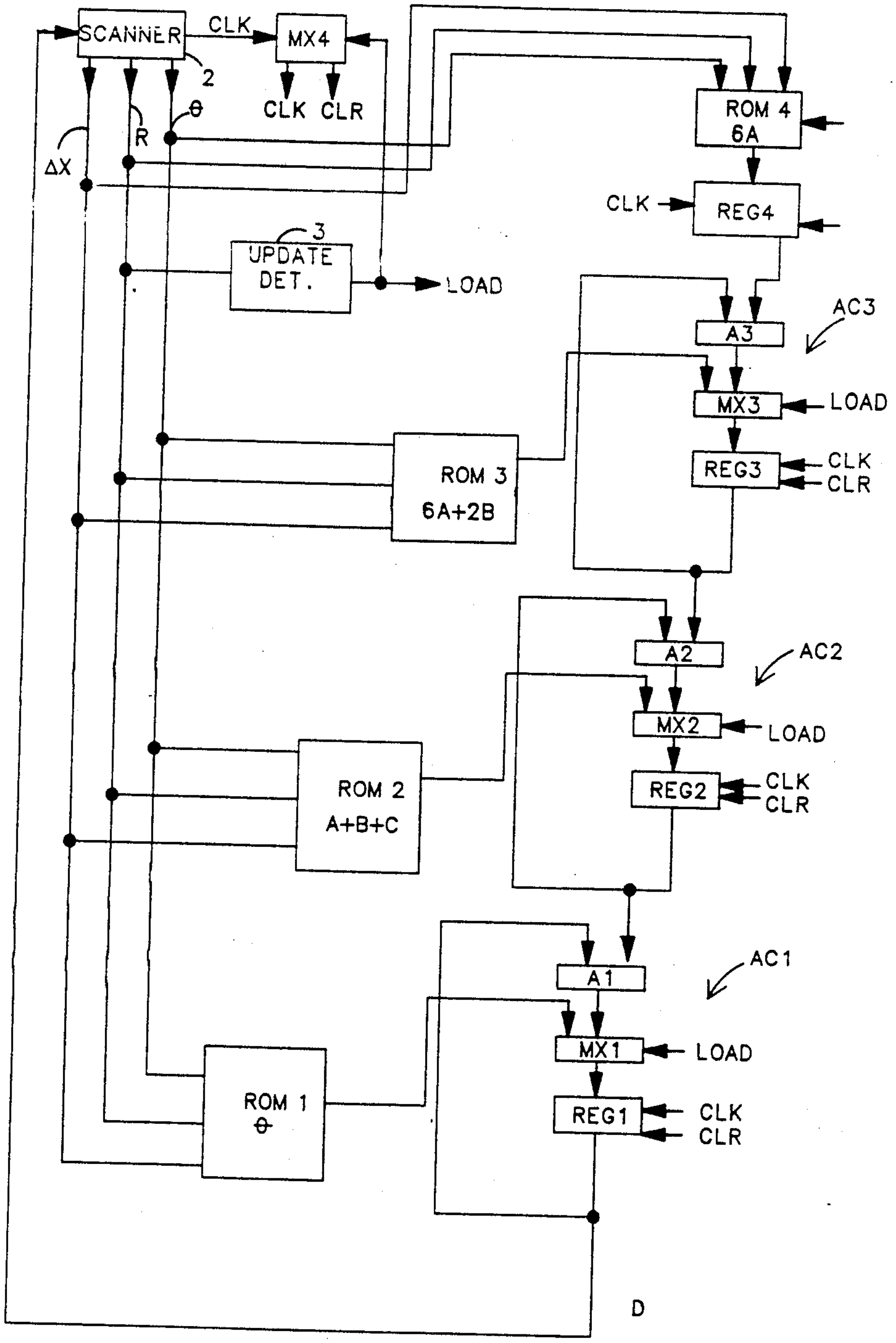
FIG. 2 is a block diagram of a series of accumulators and the preloading means therefore.

FIG. 2 is a block diagram of an embodiment of the invention designed to calculate the values of D in accordance with equation (12) in which $X^3$ is the highest power of X.

Although it is not the usual practice, it will be assumed that there is a transducer element at the center of the array so that, as will appear, the operation will be more apparent.

A scanner 2 for the ultrasonic imaging system may operate in ways described in U.S. Pat. No. 4,140,022 to transmit pulses of a few cycles of pressure waves along successive radial lines and to provide the delays required for each transducer element that are necessary to focus the array at each focal point. The value of the radius R and the angle $\theta$ of the radial line as well as the spacing $\Delta X$ between adjacent transducer elements of the particular array being used are readily derived from the scanner. These values are applied to ROMs 1, 2, 3 and 4 which respectively output the values of $\phi$; $A+B+C$; $6A+2B$; 6A for each focal point. From equation (12) it can be seen that the values of A, B and C are different for each focal point.

Because the highest power of X is $X^3$, three accumulators AC1, AC2 and AC3 are provided each having an adder coupled to a register via a multiplexer. Only accumulator AC1 will now be described, but AC2 and AC3 are identical. The output of an adder A1 is connected to one input of a multiplexer MX1, and its output is connected to the input of a register REG1. The other input of MX1 is connected to the output of the ROM1. One input of Al is connected to the output of REG1 so as to perform the accumulating function, and the other input of A1 is connected to the output of a register REG2 for the accumulator AC2.

The output of ROM4 is connected to a register REG4, and its output is connected to one of the inputs of the adder A3 for the accumulator AC3.

Clock pulses for the system are derived from the scanner 2 are applied to a multiplexer MX4. When reflections from a point half way between adjacent focal points are due to arrive at the array, the value of R is updated to the radius of the next farther focal point. This fact is detected by an update detector 3. Its output is applied to MX4 so as to cause it to output a clock pulse that is applied to the clear terminals of the registers REG1, REG2 and REG3. Subsequent clock pulses are applied to the clock terminals of all registers. The output of the detector 3 is also applied to load terminals of the multiplexers MX1, MX2, and MX3 so as to cause them to preload the values of $\phi$, $A+B+C$ and $6A+2B$ for the next focal point into the registers REG1, REG2 and REG3, respectively. On the next clock pulse and for the rest of the calculation, the multiplexers MX1, MX2 and MX3 respectively connect the outputs of their adders to the inputs of their registers. The value of 6A from the ROM4 is always applied to one input of the adder A3 for the accumulator AC3.

The ROM1 supplies the value of D for the transducer element closest to the center of the array. In this particular example the transducer is at the center of the array so that $X=0$ and D also equals 0. If, as is usual, the transducer element closest to the center is at $\Delta X/2$, the value provided by the ROM1 would be $A/8+B/4+C/2$. In any event at each successive clock pulse the preloaded values step through the accumulators AC3, AC2, and AC1 so as to provide a value D for the next outer transducer element at the output of the register REG1 for the accumulator AC1. Its output is supplied to the scanner 2 so as to give it information as to the delay to be used at a focal point for each transducer element in turn.

This operation is now explained in greater detail in connection with FIG. 3 wherein columns C1, C2, C3 and C4 respectively show the outputs of the registers REG1, REG2, REG3 and REG4 at every clock pulse, and a column C5 shows the clock pulse number and the number of the transducer element corresponding to the value of D at the output of REG1.

At clock pulse #1 all registers are cleared. At clock pulse #2 the load pulse from the detector 3 causes the multiplexers MX1, MX2 and $MX^3$ to preload the registers REG1, REG2 and REG3 with the values $\phi$, $A+B+C$ and $6A+2B$ respectively. The value of D at the output of REG1 is $\phi$, as is required for the transducer element at the center of the array.

At clock pulse #3, the value of D for transducer element #1 that is $\Delta X$ from the center of the array appears at the output of REG1. By substituting 1 for X in equation (12), since $\Delta X$ is the unit of measure, the value of D for this transducer element is seen to be $A+B+C$. That this value is produced can be seen from the fact that Al adds the value of $\phi$ at the output of REG1 to the output, $A+B+C$, from the output of REG2.

At clock pulse #4, the delay D is for the transducer #2, which, by substitution of 2 for X in equation (12) is seen to be $8A+4B+C$. This is derived at clock #4 in the following manner. At clock #3 the adder A2 adds its preloaded value of $A+B+C$ to the preloaded value of $6A+2B$ from REG3 so as to derive $7A+3B+C$, and at clock #4 the latter value is added by A1 to $A+B+C$ which was produced at the output of REG1 at clock #3 as described above so as to produce the required value of $D=8A+4B+2C$. It takes until clock pulse #5 for the value 6A to affect the outputs of REG1. The values of D for the other transducer elements are derived in a similar manner.

In this example, the values of X and $\theta$ are positive so that the values of D are for transducer elements in FIG. 1 that are at the right of the center $\phi$ of the array and for focal points in the quadrant where the focal point F is located. The values with which the registers are preloaded for other situations will not be fully derived, but it can be seen from FIG. 1 that D would have a negative value for transducer elements to the left of the center $\phi$ of the array and that this would result from making X negative. For a transducer element at $X=-1$, the value of D determined from equation (12) would be $-A+B-C$, so as to be negative, and this value would be preloaded into REG2 from ROM2, at the second clock pulse. At clock pulse #3 the value of D would be for the transducer element at $X=-2$ so as to have a value determined from equation (12) of $-8A+4B-2C$. In order to attain this value, the value preloaded into REG3 by ROM3 would have to be $-6A+2B$. By continuing to work backward the value preloaded into REG4 by ROM4 would be found to be $-6A$.

In deriving the preloaded values for a focal point in the left quadrant of FIG. 1 the sign of $\mathrm{SIN}\theta$ would be negative so as to make the sign of A plus and the sign of C minus.

Let us define the values of the four registers as follows:

$F(X)=REG1$ $G(X)=REG2$ $H(X)=REG3$ $I(X)=REG4$

What we need for the initial register preloads are the four values F(0), G(0), H(0), I(0).

From the block diagram we see that:

$$F(X+1)-F(X)=G(X) \quad \text{(i)}$$

$$G(X+1)-G(X)=H(X) \quad \text{(ii)}$$

$$H(X+1)-H(X)=I(X) \quad \text{(iii)}$$

Also, since the final desired output is to come from REG1, $$F(X)=AX^3+BX^2+CX \quad \text{(iv)}$$

By solving (iv) at $X=0$ we have $F(0)=0$ (v)

We get G(0) by solving (i) at $x=0$ $$G(0)=F(1)-F(0)=A+B+C \quad \text{(vi)}$$

We get H(0) by solving (ii) at $x=0$

We have $H(0)=G(1)-G(0)$ (vii)

In order to evaluate this, we need G(1)

$G(1)=F(2)-F(1)$ from equation (i).

Solving, $$G(1)=8A+4B+2C-(A+B+C)=7A+3B+C \quad \text{(viii)}$$

Substituting (viii) into (vii), and using (vi)

we have $H(0)=7A+3B+C-(A+B+C)=6A+2B$ (ix)

We get I(0) by solving (iii) at $x=0$.

We have $I(0)=H(1)-H(0)$ (x)

In order to evaluate this, we need H(1)

$H(1)=G(2)-G(1)$ from equation (ii) (xi)

$G(2)=F(3)-F(2)$ from equation (i) (xii)

Substituting (xii) into (xi)

We have $H(1)=F(3)-F(2)-G(1)$

Solving, using (viii) above for G(1), we have $$\begin{aligned} H(1) &= 27A + 9B + 3C - (8A + 4B + 2C) - \\ &\quad (7A + 3B + C) \\ &= 12A + 2B \end{aligned} \quad \text{(xiii)}$$

Finally substituting (xiii) into (x) we have $$I(0)=12A+2B-(6A+2B)=6A \quad \text{(xiv)}$$

We have not solved for
$F(0)=0$
$G(0)=A+B+C$
$H(0)=6A+2B$
$I(0)=6A$

The preloaded values can be expressed in terms of the function F as follows:
REG1=F(0)
REG2=F(1)−F(0)
REG3=F(2)−2F(1)
REG4=F(3)−3F(2)+3F(1)

FIG. 4 illustrates some of the values that would be in the registers REG1, REG2, REG3 and REG 4 for a focal point in the right half of an array having 128 elements that is constructed in the usual manner wherein the center of a transducer element closest to the center of the array is ΔX/2 from the center. In this case the values preloaded by ROM1, ROM2, ROM3 and ROM4 into REG1, REG2, REG3 and REG4 respectively are A/8+B/4+C/2; 26A/8+2B+C; 9A+2B and 6A. Because of the fractions it is much more difficult to recognize what occurs than it was in FIG. 3. As previously discussed, different preloaded values would be used in calculating D for transducer elements in the left half of the array and for focal points in the other quadrant.

Parallel Operation

Figure 5A:
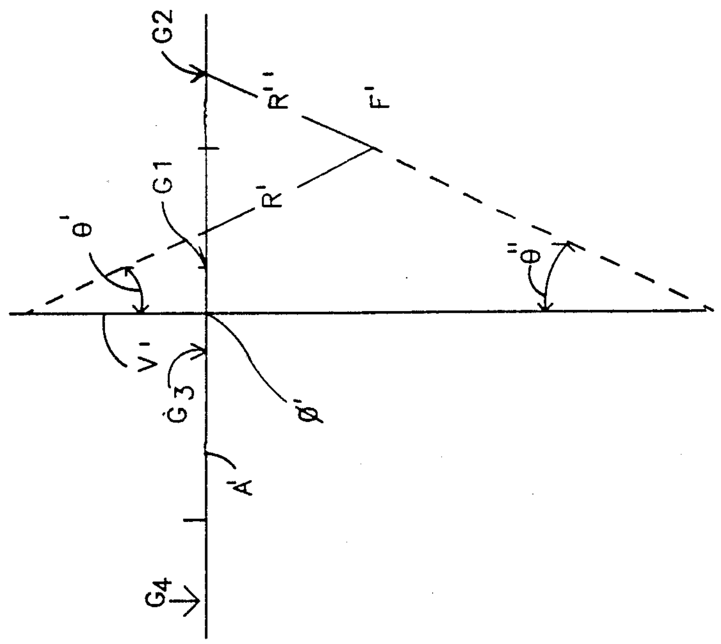
FIG. 5A illustrates use of R to center of group.
Figure 5:
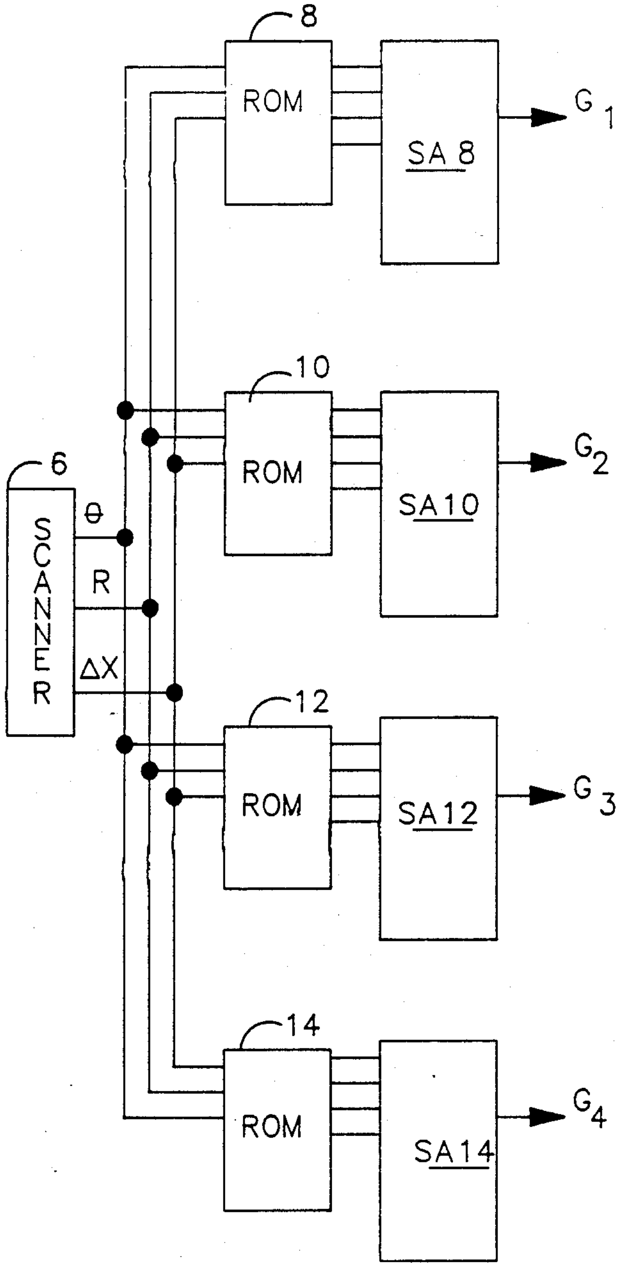
FIG. 5 is a block diagram of a system utilizing a number of series of accumulators in parallel and illustrates use of R to center of group.

One of the advantages of this invention is that a number of series of accumulators such as shown in FIG. 2 can be operated in parallel as shown in FIG. 5 so as to simultaneously derive the values of D for transducer elements in each of a plurality of groups. ROMs 8, 10, 12 and 14 respectively provide preloading values to ROMS in each series of accumulators SA8, SA10, SA12 and SA14. They in turn provide the values of D for the transducer elements in groups G1, G2, G3 and G4. Assume that G1 is immediately to the right of center, G2 is to the right of G2, G3 is to the left of center and G4 is to the left of G3 as shown in FIG. 5A. The transducer elements of G1 and G3 that are closest to the center ϕ' are ΔX/2 away from it.

One way of operating the system of FIG. 5 is as follows: If G1 has elements at X=½ to X=63/2, the registers in the series of accumulators not shown that derive the value of D for these transducer registers that respectively correspond to REG1, REG2, REG3 and REG4 of FIG. 2 are respectively preloaded with A/8+B/4+C/2; 26A/8+2B+C; −9A+2B and 6A, and if G2 has elements at X=65/2 to 129/2, its registers, not shown, that correspond to REG1, REG2, REG3 and REG4 are respectively loaded with 251,607 A/8+39,77B/4+63C/2; 23,018A/8+62B+C; 195A+2B and 6A which are seen to be the values that would appear in the registers of G1 when it made the calculation of D for its transducer element that is farthest to the right and next to the first transducer element in G2.

It will be found that the error in D is nearly zero at the center of the array and that it increases as the calculation proceeds to outer transducer elements. In the parallel method of calculation just described, the series of accumulators SA10 that make the calculation of D for the transducer elements in G2 would be deriving the same values that the series SA8 would derive if it were permitted to continue the calculation of D for the elements in G2. Therefore, the errors are the same.

Another method for operating a plurality of series of accumulators in parallel so as to reduce the increase in error that occurs as the distance X of the transducer from the center ϕ of the array increases is now explained by reference to FIG. 5A as follows. For G1, the value of R', which is the distance between a focal point F' and the center of G1, is substituted for R in the expressions for A and B used in equation (12), and θ', which is the angle between R, and a line V, that is perpendicular to the array A', is substituted for θ in the expressions for A, B and C. It will be found that there is no error in D for a transducer element at the center of G1, that the error increases with the distance of a transducer element of G1 from its center and that the error for the outermost transducer element of G1 will be less than before. This same error will exist for the innermost element of G1 whereas in the other method it was zero.

A much more significant reduction in error will occur when this technique is applied to the calculation of D for the transducer elements of a group like G2 that is farther out on the array. The value of the distance R″ between F′ and the center of G2 is substituted for R in the expression for A and B and θ″, the angle between R″ and V′, is substituted for θ in the expressions for A, B and C. The error at the center of G2 will be zero, and although the error increases with the distance of an element from the center of G2, the error will be much less than that occurring in the first method.

Another way of describing the second method is as follows. Express the equation (8) for the distance D in the form of a Taylor series where the offset, a, in the series is the distance between the center of a group and the center of the array. New values of A, B, and C, as well as a value D equal to D(a) will be derived and used to preload the registers of FIG. 2. Once again, however, it will be necessary to derive these preload values by working backward and to realize that they will be different for the calculations for one half of a group of elements than for the other.

Another method for reducing and more evenly distributing the error over the transducer elements of the array is to expand the expression for D in terms of Legendre polynomials and substitute these polynomials for A, B, and C in equation (12). Although the Legendre technique is known, a brief summary follows.

Repeating equation (8) for convenience $$D=R-R\sqrt{ax^2+bx+1} \qquad (8)$$

where $a=1/R^2$ and $b=-2\ \mathrm{SIN}\ \Theta$

This can be put into the approximate form:

$$D(X)=AX^3+BX^2+CX+K \qquad (13)$$

(A, B, C and K will be determined by a Legendre expansion)

A Legendre Expansion can be made as follows:

Step 1

Choose the interval of X as α through β in which α and β are the positions of the first and last transducers the group.

Step 2

Calculate the integrals from the Table I below

TABLE I $$I_E = \int_\alpha^\beta \frac{dx}{\sqrt{ax^2+bx+1}} =$$

$$\frac{1}{\sqrt{a}} \mathrm{LOG}\left[\sqrt{a\beta_2+b\beta+1} + \sqrt{a}\,\beta + \frac{b}{Z}\sqrt{a}\right] -$$

$$\frac{-1}{\sqrt{a}} \mathrm{LOG}\sqrt{a\alpha^2+b\alpha+1} + \sqrt{a}\,\alpha = \frac{b}{Z}\sqrt{a}$$

$$Ik = \int_\alpha^\beta \sqrt{ax^2+6X+1}\,dx =$$

$$\left[\frac{2aB+b}{4a}\right]\sqrt{a\beta^2+b^\beta+1} -$$

$$\frac{2a\alpha+b}{4a}\sqrt{ad^2+bx+1} + \frac{4a-b^2}{8a}\cdot I_E$$

$$I_c = \int_\alpha^\beta X\sqrt{ax^2+bx+1}\,dx =$$

$$\left[\frac{aB^2+bB+1}{3a}\right]^{3/2} - \frac{a\alpha^2+b\alpha+1^{3/2}}{3a} - \frac{b}{2a}\cdot I_k$$

$$I_B = \int_\alpha^\beta x^2\sqrt{ax^2+bx+1}\,dx =$$

$$\beta\frac{(a\beta^2+b\beta+1)^{3/2}}{4a} - \alpha\frac{(a\alpha^2+b\alpha+1)^{3/2}}{4a}\ \frac{-7b}{8a}\cdot$$

$$I_c\frac{-1}{4a}\cdot I_k$$

$$I_A = \int_\alpha^\beta x^3\sqrt{ax^2+bx+1}\,dx =$$

$$\beta^2\frac{(aB^2+b\beta+1)^{3/2}}{5a} -$$

TABLE I-continued $$a^2 \frac{(a\alpha^2 + b\alpha + 1)^{3/2}}{5a} - \frac{9b}{10a} I_B - \frac{2c}{5a} I_c$$

Step 3

Calculate the Coefficients Given in Table II Below:

TABLE II $$Z_A = \sqrt{\frac{7}{4(B-\alpha)}} \left\{ \left[ 5\left(\frac{\beta+\alpha}{\beta-\alpha}\right)^3 - 3\left(\frac{B+\alpha}{c-\alpha}\right) \right] \cdot I_k + \left[ \frac{6}{(\beta+\alpha)} - 30\frac{(\beta+\alpha)^2}{(\beta-\alpha)^3} \right] \cdot I_c + 60\frac{(\beta+\alpha)}{(\beta-\alpha)^3} \cdot I_B - \frac{40}{(\beta-\alpha)^3} \cdot I_A \right.$$

$$Z_B = \sqrt{\frac{5}{4(\beta-\alpha)}} \left\{ \left[ 1 - 3\left(\frac{\beta+\alpha}{\beta-\alpha}\right)^2 \cdot I_k + 12\frac{(B+\alpha)}{(B-\alpha)^2} \cdot I_c - \frac{12}{(\beta-\alpha)^2} \cdot I_B \right.\right.$$

$$Z_C = \sqrt{\frac{3}{(\beta-\alpha)}} \cdot \frac{1}{(B-\alpha)} \cdot [2 \cdot I_c - (\beta+\alpha) \cdot I_k]$$

$$Z_k = \frac{1}{\sqrt{\beta-\alpha}} \cdot I_k$$

Step 4

Use Table III to calculate A, B, C, and k $$A = R \cdot Z_A \cdot \sqrt{\frac{7}{4(\beta-\alpha)}} \cdot \frac{40}{(\beta-\alpha)^3}$$

$$B = R \cdot Z_B \cdot \sqrt{\frac{5}{4(\beta-\alpha)}} \cdot \frac{12}{(\beta-\alpha)^2} - R \cdot Z_A \sqrt{\frac{7}{4(\beta-\alpha)}} \cdot \frac{60(\beta+\alpha)}{(\beta-\alpha)^3}$$

$$C = R \cdot Z_C \cdot \sqrt{\frac{3}{\beta-\alpha}} \left(\frac{\beta+\alpha}{\beta-\alpha}\right) - R \cdot Z_B \sqrt{\frac{5}{4(\beta-\ )}} \cdot \frac{12(\beta+\alpha)}{(\beta-\alpha)^2} + RZ_A \sqrt{\frac{7}{4(\beta-\alpha)}} \left[ \frac{6}{(\beta-\alpha)} - \frac{30(\beta+\alpha)^2}{(\beta-\alpha)^3} \right]$$

$$K = R - R \cdot Z_x \cdot \frac{1}{\sqrt{\beta-\alpha}} + R \cdot Z_C \cdot \left(\frac{\beta+\alpha}{\beta-\alpha}\right) \sqrt{\frac{3}{\beta-\alpha}} - R \cdot Z_B \sqrt{\frac{5}{4(\beta-\alpha)}} \cdot \left[ 1 - 3\left(\frac{\beta+\alpha}{\beta-\alpha}\right)^2 \right] -$$

-continued $$R \cdot Z_A \frac{7}{4(\beta-\alpha)} \cdot \left[ 5\left(\frac{\beta+\alpha}{\beta-\alpha}\right)^3 - 3\left(\frac{\beta+\alpha}{\beta-\alpha}\right) \right]$$

EXAMPLE OF LENGENDRE METHOD

Figure 6A:
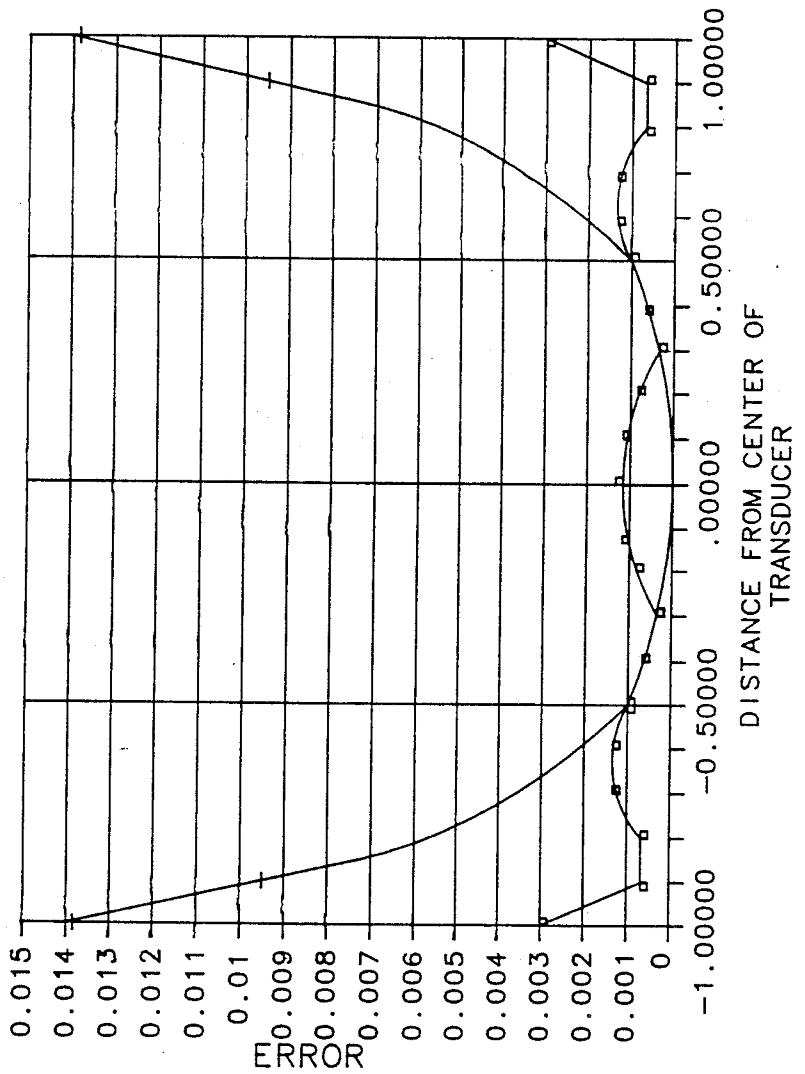
FIG. 6A is a graphical comparison of the error distribution resulting from the use of coefficients of a series derived from Legendre polynomials and the error obtained using the usual coefficients.
Figure 6:
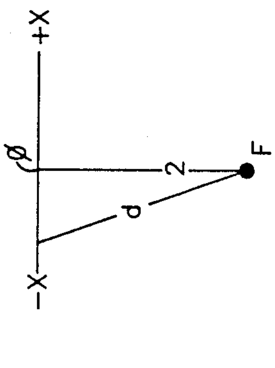
FIG. 6 illustrates a special situation used in comparing results attained by coefficients derived from Legendre polynomials and coefficients of a Maclaurin series.

Reference is made to FIGS. 6 and 6A for a comparison of the errors resulting from using for the coefficients A, B, and C of the powers of X in a series the values determined by the Legendre method and values ordinarily used. In FIG. 6 an array of transducer elements is assumed to lie between +X and −X, and a focal point F is placed two units away from the array in a line that is perpendicular to its center at $\phi$. This is a special case in which calculations are simplified because $\mathrm{SIN}\theta = \phi$ and $\mathrm{COS}\theta = 1$.

Applying the steps of the Legendre method we find

Step 1

$\alpha = -1, \beta = +1$ $$a = \frac{1}{R^2} = \tfrac{1}{4} \quad \text{From Equation 8}$$

$$b = \frac{-2\mathrm{SIN}\theta}{R} = 0 \quad \text{From Equation 8}$$

Step 2

Evaluate integrals of Table I $I_E = 2\,\mathrm{LOG}[\sqrt{1.25}+0.5] - 2\mathrm{LOG}[\sqrt{1.25}-0.5] \cong 1.9248473$ $I_k = \sqrt{1.25} + 5I_E \cong 2.08045764$ $I_C = 0$ by symmetry $I_B = 2(1.25)^{3/2} - I_k \cong 0.71462733$ $I_A = 0$ by symmetry Step 3

Calculate coefficients in Table II $Z_A = 0$ $$Z_B = \sqrt{\tfrac{5}{8}}\,[I_k - 3I_B] = -.05014136$$

$Z_C = 0$ $$Z_k = \frac{1}{\sqrt{2}} I_k = 1.4110571$$

Step 4

Use Table III to determine A, B, C and k:

$A = 0$ $$B = 3\sqrt{\frac{5}{2}}\, Z_B \cong -.237841368$$

$C = 0$ $$k = 2 - \sqrt{2}\, Z_k - \sqrt{\frac{5}{2}}\, Z_B \cong -.001177184$$

Therefore:

$$D \cong AX^3 + BX^2 + CX + K \cong -0.23784X^2 - 0.00118$$

If we use the Maclaurin series, equation (12), we get:

$$A = \frac{-\text{SIN}\theta\ \text{COS}^2\theta}{2R} = \phi$$

$$B = \frac{-\text{COS}^2\theta}{2R} = -.25$$

$C = SIN\theta = 0$ k=0

Which yields the following approximation for D(X):

$$D(X) \cong -0.25X^2$$

In FIG. 6 a graph L shows the error in d resulting from the use of the Legendre method and a curve M shows the errors resulting from the use of the Maclaurin method.

Note that the error due to the Maclaurin method is correct at X=0 and that it increases with the values of X whereas the error due to the Legendre method is correct at points on either side of X=0 and is generally less than that of Maclaurin at larger values of X.

In applying the Legendre method to a system such as that shown in FIG. 2, the value of $\alpha$ and $\beta$ are chosen in Step 1 to be the numbers of the transducer elements of a group that are respectively the closest and farthest from the center 0 of the array. By doing this the error within a group is generally reduced and more equally distributed throughout the group.

Summary

In carrying out the invention the difference D between the distance of a focal point from a reference point on the array, usually the center, and the distance between a focal point and a transducer element is expressed as a function of the distance X of a transducer element from the reference point. The expression for D is expanded into a series having terms respectively containing different powers of X. The coefficients of these terms will include trigonometric functions of an angle between a perpendicular to the array and a line drawn between the focal point and the reference point, or, in another method, a line drawn between the focal point and the center of a group of transducer elements. The coefficients, i.e. the A, B, and C referred to, also include the distance of the focal point from the reference point or, in another method, the distance between the focal point and the center of a group of transducer elements. The unit of X is the distance $\Delta X$ between the centers of adjacent transducer elements of the array in use.

The number of terms of the series that are required for the desired resolution is determined, and a number of accumulators equal to the highest power of X are coupled in series. In the procedures illustrated by FIGS. 3 and 4, the last accumulator in the series was preloaded with the combination of A, B, and C or parts thereof for the transducer elements of a group of elements that was closest to the center of the array, and the preloading for the previous accumulators in the series was determined by working backwards to see what the respective preloading had to be in order to give the correct values of D. The first accumulator in the series was preloaded in two ways, i.e. by preloading the register and by supplying the value 6A to its adder. After the accumulators have been clocked a sufficient number of times for the value 6A to contribute to the value provided by the register of the last accumulator of the series all preloaded values except 6A have no further effect.

Instead of calculating the values of D for the transducer element of a group that is closest to the center of the array, it would be possible to start with the outermost element and work toward the center. In order to do this, the preloaded values would be determined by preloading the register of the last accumulator with the values of A, B, C, etc. determined from equation (12) by substitution therein of the value of X for the outermost transducer element and working backward as before.

In all of these methods the values of A, B, and C can be derived from Legendre polynomials.

We claim:

1. Apparatus for providing signals D indicative of the delays for a group of transducer elements of an array that are required to focus them at a focal point comprising:

a plurality of accumulators connected in series;

means for clocking said accumulators;

means for continuously loading the first accumulator in the series with a given combination of the coefficients of the terms of a polynomial series representing the difference between the radius of a focal point and its distance from transducer elements as a function of their distance from the center of the array; and means for initially preloading the said accumulators, with respectively different combinations of the coefficients of the terms of said polynomial series, the preloading of the last accumulator in the series being the value of D for a given transducer element in the group whereby the output of the last accumulator in the series at each clock pulse represents the value of D for the adjacent transducer element.

2. Apparatus as set forth in claim 1 wherein said coefficients are derived from LeGendre polynomials.

3. Apparatus as set forth in claim wherein said continuous loading of said first accumulator is 6A, its initial preloading is 6A+2B, the initial preloading for the next accumulator in the series is A+B+C, and the initial preloading for the next accumulator in the series is zero, where A, B, and C are the respective coefficients of a Maclaurin series for $X^3$, $X^2$, X so as to calculate the delays for transducers of a first group.

4. Apparatus as set forth in claim 3 wherein $$A = -\frac{\text{SIN}\theta\ \text{COS}^2\theta}{2R^2}$$

$$B = +\frac{\text{COS}^2\theta}{2R}$$

$C = \text{SIN}\theta$, the angle $\theta$ being the angle between a line drawn from a focal point to said array and a line perpendicular to said array and R being the length of said line.

5. Apparatus as set forth in claim 1 wherein said coefficients are the coefficients of a Maclaurin series.

6. Apparatus as set forth in claim 3 further comprising:

a second plurality of accumulators connected in series, means for clocking said second plurality of accumulators, means for continuously loading the first accumulator of said second plurality of accumulators with 6A, and means for respectively preloading the accumulators of said second plurality of accumulators with combinations of A,B, and C that would appear at the outputs of corresponding ones of the first mentioned plurality of accumulators after the latter have been clocked a given number of times so as to calculate the delays for the transducers of a second group as said second plurality of accumulators is being clocked.

7. Apparatus as set forth in claim 6 wherein $$A = -\frac{\mathrm{SIN}\theta\ \mathrm{COS}^2\theta}{2R^2}$$

$$B = +\frac{\mathrm{COS}^2\theta}{2R}$$

$C=\mathrm{SIN}\theta$, the angle $\theta$ being the angle between a line drawn from a focal point to said array and a line perpendicular to said array and R being the length of said line.

8. Apparatus as set forth in claim 1 wherein said coefficients are the coefficients of a Taylor series.

9. Apparatus for providing signals D indicative of the respective delays for transducer elements of a group of transducer elements in an array that are required to focus them at a focal point comprising:

a plurality of accumulators connected in series, means for clocking said accumulators, means for continuously loading the first accumulator in the series with a given combination of coefficients of terms of a polynomial series representing the difference between the distance of a focal point from the center of said group and its distance from transducer elements of the group as a function of their distances from the center of the group; and means for initially preloading the said accumulators with respectively different combinations of the coefficient of the terms of said polynomial series, the preloading for the last accumulator in the series having the combination of coefficients for the value D for a given transducer element in the group, the said coefficients being expressed in terms of the length of a straight line between the focal point and the center of said group and the values of the Sine and Cosine of an angle said line makes with a line perpendicular to the array.

10. Apparatus for providing signals D indicative of the respective delays for transducer elements of an array that are required to focus them at a focal point comprising:

a plurality of accumulators connected in series, means for clocking said accumulators, means for continuously loading the first accumulator in the series with a given combination of coefficients of the terms of a polynomial series representing the difference between the distance of a focal point from a given point in the array and the distance between the focal point and another point in the array as a function of the distance between said points, and means for initially preloading the said accumulators with respectively different combinations of the coefficients of said polynomial series whereby the output of the last accumulator in said series represents the signal D for a different transducer element at each clocking of the accumulators.

11. Apparatus as set forth in claim 10 wherein:

the preloading of the last accumulator in the series of accumulators is indicative of the value of D for a given transducer in the array, the preloading of each previous accumulator in the array represents the difference in D of the accumulator coming after it for adjacent clockings, and the continuous loading of the first accumulator in the series represents the difference in the output of said first accumulator at adjacent clockings.

* * * * *